UNITED STATES PATENT OFFICE.

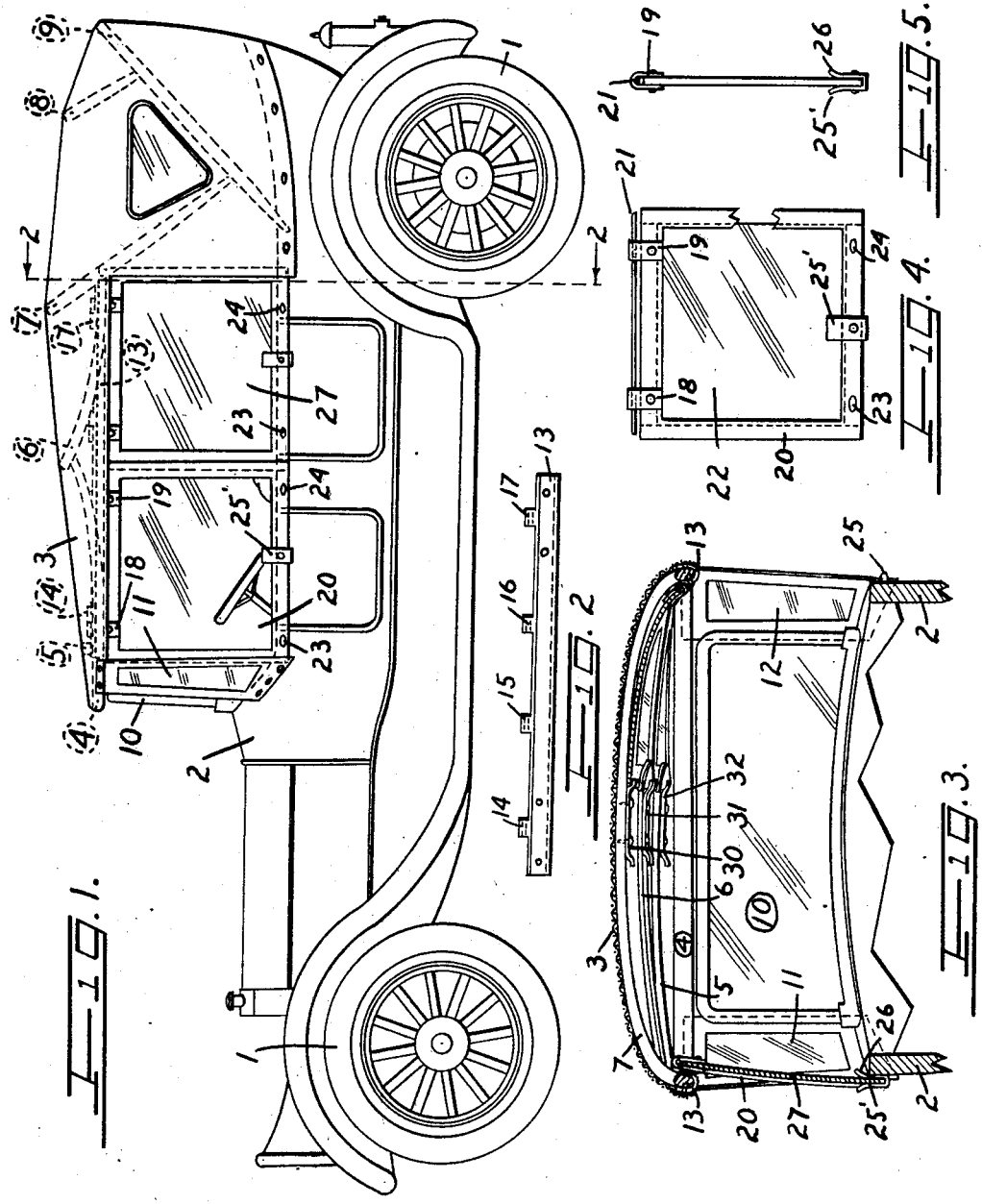

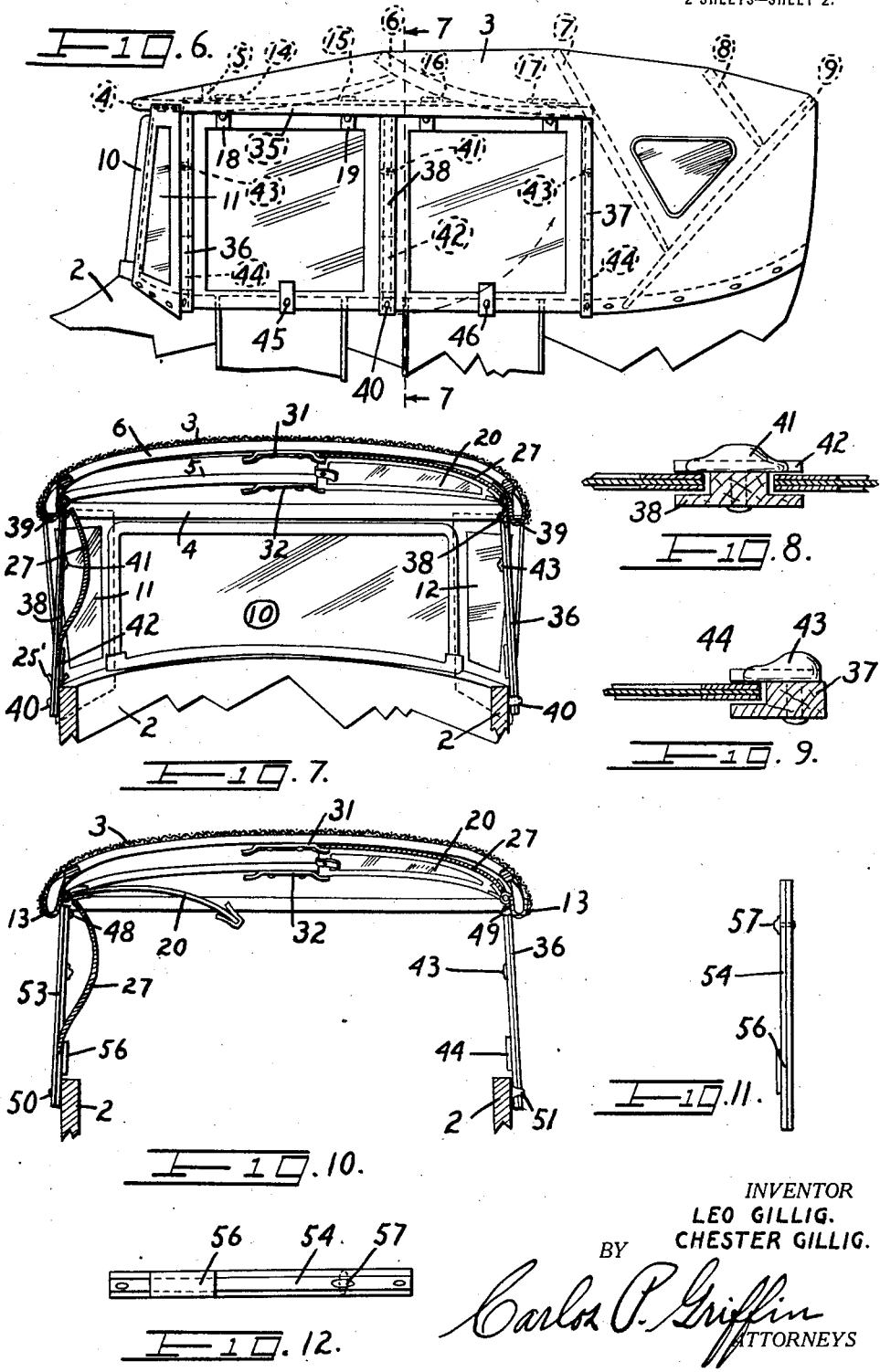

LEO GILLIG AND CHESTER GILLIG, OF SAN FRANCISCO, CALIFORNIA.

SIDE CURTAIN FOR AUTOMOBILES.

1,388,425.  Specification of Letters Patent.  Patented Aug. 23, 1921.

Application filed May 13, 1919. Serial No. 296,794.

*To all whom it may concern:*

Be it known that we, LEO GILLIG and CHESTER GILLIG, citizens of the United States, residing at San Francisco, in the county of San Francisco, State of California, have invented new and useful Side Curtains for Automobiles, of which the following is a specification in such full and clear terms as will enable those skilled in the art to construct and use the same.

This invention relates to the side curtains of an automobile and its object is to produce a series of side curtains which may be lowered in place to inclose the automobile, or which may be without their removal from the top, folded up and concealed under the top.

It is intended that the curtains herein disclosed may be used either by themselves, or in conjunction with a hinged supporting strip adjacent each curtain, or with the detachable parting strip between the curtains as may be desired.

Another object of the invention is to provide a series of curtains which may be used in conjunction with any automobile top, and applied thereto by the simple application of two or four screws as may be desired for each set of curtains, and which may be at once removed from the top by the removal of these screws; no mechanical change in the top being necessary for the application thereto of these curtains.

Other objects of the invention will appear as the description proceeds.

An embodiment of the invention is shown in the drawings in which the same reference numeral is applied to the same portion throughout, but we are aware that there may be modifications thereof.

Figure 1 is a side elevation of an automobile having these curtains applied thereto, Fig. 2 is a side elevation of the metal strip which supports the curtains detached from the automobile, Fig. 3 is a transverse sectional view on the line 2—2, Fig. 1, showing the positions the curtains occupy when raised up in the top, in a flexed condition, Fig. 4 is a side elevation of one of the curtains alone, Fig. 5 is an edge elevation of one of the curtains, Fig. 6 is a side elevation of a portion of an automobile body and the top therefor, in which a pivoted parting strip is used for holding the curtains where their edges come together, Fig. 7 is a transverse sectional view of the top and body shown in Fig. 6 on the line 7—7 looking in the direction of the arrow, Fig. 8 is a plan view of a portion of the pivoted parting strip or bar showing one of the buttons for holding the curtains in place, Fig. 9 is a plan view of one of the bars adjacent the front and rear edges of the curtain showing the manner of holding the curtain, Fig. 10 is a transverse sectional view of a portion of the automobile body and top having these curtains applied thereto and showing a detachable parting strip for holding the curtains at their adjacent edges, Fig. 11 is an edge elevation of the parting strip shown in Fig. 10, and Fig. 12 is a side elevation of the parting strip used with the top shown in Fig. 10.

The numeral 1 indicates the wheels of the automobile which has the body 2 applied thereto. This body has a common form of top 3 supported thereon, which top in the present instance is provided with bows 4 to 9 inclusive for its support. This top is connected to the wind shield 10 in a manner well known in the art, and it has corner curtains extending from the front portion of the top to the front portion of the body of the automobile as indicated at 11 and 12. Said curtains are for the purpose of filling the space between the wind shield and the straight portion of the body of the car at the front edges of the side curtains.

The side curtains are carried by a suitable support, in this case a U shaped metal bar 13, which is as long as the space from the corner curtains 11 and 12 to the front edge of the fixed rear portion of the top. Each of these bars have suitable ears or hinge lugs 14 to 17 inclusive, between which ears in pairs, the ears or hinge lugs 18 and 19 of each curtain 20 are placed and secured by means of a hinge rod 21. The bars 13 form a support for the curtains separate from the top and when it is desired to remove the curtains they may be detached bodily by the removal of the screws which pass through the four openings shown in Fig. 2. The curtain is provided with a suitable flexible outer frame of any spring material, and with a transparent window 22 also made of a flexible material. Or, the curtain may be made entirely of the flexible transparent material.

At the bottom, each curtain is provided with two openings 23, 24 to receive the curtain fasteners 25. In order to handle the curtain, each curtain is provided with a tab inside and out as indicated at 25', 26.

The front curtain 20 is so positioned that it will lie outside the rear curtain 27 when in use, the object being to prevent the movement of the car from forcing the two curtains apart as the car travels forward.

In order to raise the curtains and open the car, all that is necessary is to flex the curtains sufficiently for them to be withdrawn from their position outside the car body as illustrated in Fig. 1, and then swing them up until their edges engage depending cleats 30, 31 and 32 secured to the under side of the bows of the car. These cleats have depending lugs at their opposite ends and serve to hold both sets of curtains up when it is so desired, note Fig. 3 in which one set of curtains is shown raised and the other set of curtains is shown down and secured to the side of the car body.

Where it is desired to make the curtains more secure than is shown in Figs. 1 to 5 inclusive, the flexible curtain shown in Figs. 6 and 7 may be used. In these figures, 6 and 7, the bar 35 is precisely the same as the bar 13 shown in Fig. 2 and is secured to the top in the same way, but adjacent the curtain 11 there is provided a fixed bar 36 connected with the top and the body, and adjacent the rear edge of the rear curtain, there is provided a bar 37, while between the two curtains there is a rabbeted bar 38 which is pivoted to the member 35 at 39, and is detachably connected with the body at its lower end by means of the button 40. The bar 38 may have one or more pivoted buttons 41 thereon, which are capable of being turned to the position shown in Fig. 8 for the purpose of holding both curtains firmly in the desired position when down; or it may be turned to a position to permit the curtains to be removed when the curtains are to be raised. Said buttons are narrower in one plane than in another. This guide member is grooved for a portion of its length as indicated by the dotted lines at 42 in order to more securely hold the lower ends of the curtains.

When the curtain is to be removed and raised, it is flexed as indicated in Fig. 7 to lift it out of the guide 42. The bars 36 and 37 are also provided with turnable buttons as indicated at 43, and at their lower portions, they have guides as indicated at 44 which are of substantially the same height as the guide 42 shown in Fig. 7.

Since the material of which the curtains are to be made is more or less flexible and will flap considerably with the wind due to the motion of the car, additional buttons as indicated at 45, and 46 on the car body may be used for holding the curtains in the position shown in Fig. 6.

The bar 38 when not in use, may be folded up as shown at 38 on the right hand side of Fig. 7, the curtains being then folded up as indicated, and held by the cleats 30 to 32 inclusive, the same as in the previous form of the invention.

In the form of the invention shown in Figs. 10 to 12 inclusive, the top, car body and members 13 are precisely the same as in the previous form of the invention except that the members 13 are each provided with curtain fasteners 48, 49 which in conjunction with the fasteners 50, 51 on the car body, are used to hold the two guide rods 53, 54 detachably in place the same as the pivoted guide rod 38. This guide rod is also provided with a groove for a portion of its length at 56 so that when the curtain is removed therefrom, the same is flexed as in Fig. 7, and in the same way, this guide rod has a button at 57 to hold the upper portion of the curtain down when it is in place precisely the same as the button 41 on the pivoted bar 38.

In operation, the curtains are raised and flexed until they are caught by the ends of the depending lugs 30 and 32 inclusive, which lugs then securely hold the curtains in place snugly against the under side of the top below the bows. When in use, the curtains are flexed enough to remove their lower edges from the lugs 30 to 32 inclusive and they may then be turned down to the position shown in Figs. 1, 3, 6, 7 or 10, and may be secured by means of the ordinary curtain fasteners previously referred to.

It is to be noted that the material of which the curtains are made may be any sort of flexible material, having more or less windows therein of a flexible material as may be desired. The particular material of which the curtains are constructed not being material to the invention.

Having thus described our invention, what we claim as new and desire to secure by Letters Patent of the United States is as follows, express reservation being made of permissible modifications.

1. Side curtains for automobiles comprising an automobile carrying a top, a series of single unit curtains hinged to the outer edge of the top, means to secure the lower edge of the curtains against the body when they are down, and clips adjacent the middle of the top to secure the curtains flexed against the underside of the top when raised.

2. Side curtains for automobiles comprising an automobile carrying a top, flexible single unit curtains hinged at their upper edges to the outer edge of the top, means carried by the automobile body to hold the curtains at their lower edges when down, and depending cleats carried by the under side of the top for securing the curtains at one edge in a flexed condition snugly against the under side of the top when raised.

3. Automobile side curtains comprising the combination with an automobile top of a plurality of flexible single unit curtains therefor, each curtain being hinged to the outer edge of the top at the upper edges of the curtains, buttons for holding the lower edges of the curtain down against the automobile body, and a series of lugs or cleats for holding the edges of the curtains against the under side of the top when the curtains are suitably flexed.

4. An automobile side curtain comprising the combination with an automobile top of a bar detachably secured thereto, a single unit curtain hinged thereto, means to hold the curtain edge down against the side of the automobile, and clips under the top to hold the curtain flexed under the top when it is raised.

5. An automobile side curtain comprising an automobile top, a bar detachably secured to the edge of the top along its side, a single unit curtain hinged to said bar, buttons for holding the lower edge of the curtain when it is down, and depending cleats carried by the under side of the bows for holding the curtain in a flexed position under the top when the curtain is raised.

6. Side curtains for automobiles comprising an automobile carrying a top, a bar carried thereby, a pair of flexible single unit curtains hinged thereto one at the edge of the other, means to hold the curtains against the body at their lower edges when down, and means to hold the curtains flexed under the top when raised.

7. Side curtains for an automobile top comprising a bar carried by the top, a plurality of single unit curtains hinged thereto, a grooved bar connected to the first bar and to the automobile body, means to hold the curtains down, and means to hold the curtains flexed under the top when not in use.

8. Automobile side curtains comprising the combination with a top of a set of flexible curtains hinged to the top at their upper edges, bars having vertically extending guide ways connecting the top and automobile body, and means to hold the curtains flexed under the top.

In testimony whereof we have hereunto set our hands this 8th day of May A. D. 1919.

LEO GILLIG.
CHESTER GILLIG.